United States Patent [19]
Hasselmann et al.

[11] Patent Number: 4,500,969
[45] Date of Patent: Feb. 19, 1985

[54] METHOD AND APPARATUS FOR DETERMINING STRESS ON HOISTING EQUIPMENT

[75] Inventors: Heinz Hasselmann, Hagen; Anton Muenzebrock, Witten, both of Fed. Rep. of Germany

[73] Assignee: Mannesmann Aktiengesellschaft, Dusseldorf, Fed. Rep. of Germany

[21] Appl. No.: 331,015

[22] Filed: Dec. 15, 1981

[30] Foreign Application Priority Data

Dec. 24, 1980 [DE] Fed. Rep. of Germany ....... 3048964

[51] Int. Cl.³ .................... G01M 17/00; G08B 21/00
[52] U.S. Cl. .................................. 364/508; 364/551; 340/666; 340/685
[58] Field of Search .................. 364/508, 463, 551; 340/665, 666, 668, 685; 73/577, 760, 787, 788; 200/85 R

[56] References Cited

U.S. PATENT DOCUMENTS 3,638,211  1/1972  Sanchez .................. 340/267
4,139,891  2/1979  Sheldon et al. ........... 340/666 X
4,334,217  6/1982  Nield et al. .............. 340/685
4,336,595  6/1982  Adams et al. ............. 364/508

FOREIGN PATENT DOCUMENTS 84743   9/1971  German Democratic Rep. .
2020432 11/1979  United Kingdom .

OTHER PUBLICATIONS

Technical Measuring Method ATM 1978, vol. 12, pp. 437-442.
German Industrial Standard No. 15020(1).

Primary Examiner—Edward J. Wise
Assistant Examiner—Kevin J. Teska
Attorney, Agent, or Firm—Mandeville & Schweitzer

[57] ABSTRACT

The disclosure is directed to a method and apparatus for determining the cumulative load stress on hoisting equipment. Generally, the apparatus according to the invention comprises a system of electronic components operable to measure and indicate the cumulative load stress handled by a particular hoisting installation. The apparatus includes a time signal generator, generating a series of constant time interval electrical signals, first electrical conductor means, selectively operable to conduct an electrical signal indicating operation of the hoisting equipment and a second electrical conductor means selectively operable to conduct an electrical signal corresponding to the value of the load being handled by the hoisting equipment. First and second circuit means are electrically associated with the time signal generator and first and second electrical conductor means. The circuit means are operated to calculate the cube of the value corresponding to the load during the time interval of each particular one of the series of constant time interval electrical signals generated by the time signal generator during the operation of the hoisting equipment. Electrical adding and storage means and electrical comparator means are electrically connected to the circuit means and are operable to determine the sum of all the cube values formulated by the circuit means and to compare the sum with a predetermined maximum value. The comparator means is arranged to actuate an indicator means when there is a predetermined relationship between the sum stored in the electrical adding and storage means and the predetermined maximum value.

15 Claims, 2 Drawing Figures

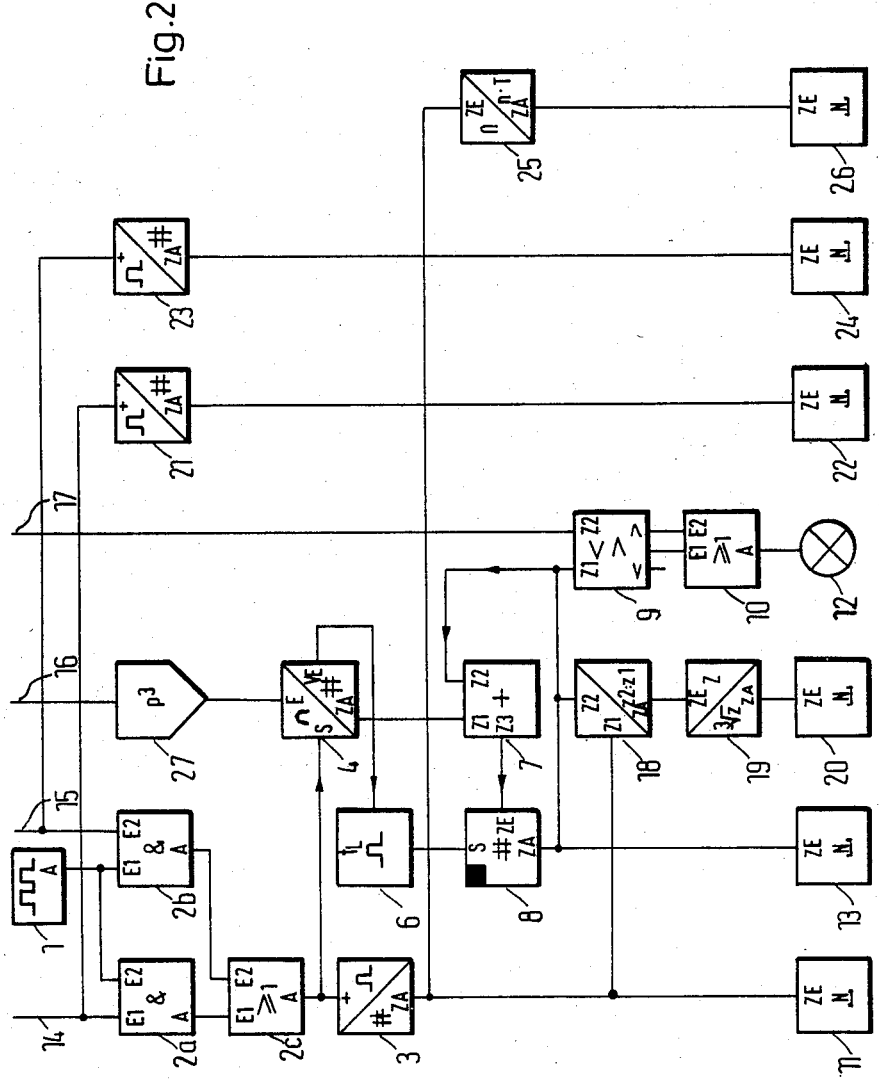

METHOD AND APPARATUS FOR DETERMINING STRESS ON HOISTING EQUIPMENT

BACKGROUND AND SUMMARY OF THE INVENTION

The invention is directed to a method and apparatus for determining the cumulative load stress on hoisting equipment, under consideration of various types of load stress.

Hoisting installations are described and classified in such a way, pursuant to the agreements and guidelines of the Federation Europeanne de la Manunetion (European Federation of Conveyor Technology, hereinafter, the FEM) that, for an intended application, a known life expectancy for the equipment, expressed in years, may be expected. To this end, the hoisting installations are divided into six groups, according to certain operating conditions known to effect equipment life expectancy. These operating conditions are 1. The mean running time per day, and
2. The cube of the mean value of the cumulative load.

In choosing a hoisting installation, values for both these magnitudes are assumed. The point here is to know as accurately as possible both of these values for the specific case of application. In a known comparable individual case of a hoisting installation, the running time may be determined somewhat reliably by timing with the aid of a service-hour meter. The cube of the mean value of the cumulative load, however, which is a time-dependent as well as a load-dependent magnitude, may be approximated only by gross estimates of the prevailing number of cases of application.

The FEM (Section IX) has issued the following formula for calculating the cube of the mean value of the stress from the cumulative load:

$$K = \sqrt[3]{(\beta_1 + \gamma)^3 \cdot T_1 + (\beta_2 + \gamma)^3 \cdot T_2 + \ldots + \gamma^3 \cdot T\Delta}$$

wherein:

$$\beta = \frac{\text{live load or partial load}}{\text{Carrying Capacity}}$$

$$\gamma = \frac{\text{Weight of load-lifting means and braking means}}{\text{Carrying Capacity}}$$

$$T = \frac{\text{Running time with live load or partial load plus weight of load-lifting means and braking means}}{\text{Total Running Time}}$$

$$T\Delta = \frac{\text{Running time with weight of load-lifting means and braking means only}}{\text{Total Running Time}}$$

In order to economize on the expenditures involved in the calculation of K, it is customary to divide the cumulative load into a limited number of load categories for which the relative running period for each category is then determined. This measuring process is, however, technically very expensive and not suitable for continuous monitoring of the hoisting installation during operation.

The classification of the hoisting equipment, in view of the cube of the mean value of the cumulative load, is based on the premise that the life time of the individual building elements depends on the value of the load cubed. Accordingly, a correlation is established between the relative wear on a hoisting installation and the pair of values consisting of total running time and cube of the mean value of the cumulative load. The correlation may also serve to indicate proper times for maintenance and prevantive maintenance of the hoisting equipment. Since, however, all basic data rest on assumptions, the calculated maintenance periods are unreliable estimates.

It is therefore the objective of the invention to provide a reliable monitoring and evaluation method for hoisting equipment. This objective is achieved by measuring the load and the running time, and, during the running time, to weigh the measured results according to their contribution to the wear on the hoisting equipment. The measured data is summed to a value characterizing the stress on the hoisting equipment, and information relating to stress conditions is indicated to an operator when a predetermined permissible stress point is reached. This information takes into account the factual stress and does not rely as previously on estimates.

The relative load is advantageously measured in equal chronological intervals or measuring cycles. The chronological intervals may, for example, be one tenth of a second and include intervals during which peak values of stress occur such as, for example, vibrations of a load at the point of initial lifting.

A value for the relative load $p = (\beta + \gamma)$ may be generated for use in a circuit according to the invention in terms of the output signal, (as either an analogue or digital value), of a load-measuring apparatus (known per se) operatively connected to the hoisting equipment, co-related to an output signal of the same apparatus corresponding to the carrying capacity of the hoisting equipment. Such an apparatus measures all of the components of the total load, i.e., live load, weight of load-lifting means and braking means, as well as the active weight of the carrying means.

By virtue of the relative load p being measured in equal chronological intervals, the relative running time t is equal to the sum of the individual measured values of p so that the sum of all values $p_i^3$ (i = 1 to n, n = number of measuring cycles) is a characteristic value for the stress on the hoisting equipment. The permissible value for $$\sum_{n=1}^{i} p_i^3$$

is accurately definable for a hoisting installation designed according to FEM rules. With these values it is possible to determine accurately the points of time for maintenance corresponding to the stress. Also accurately determinable is the point of time at which the hoisting installation has reached its predetermined life expectancy.

The determination of the cumulative load stress values, according to the method of the invention, allows for the calculation of intermediary results in a simple manner, said results characterizing the unit stress and yielding the determined stress value. An advantageous feature of the invention is that is generates information relating to the stress condition on reaching the permissible amount of stress, thereby not only indicating that a predetermined stress value has been reached, but additionally containing the reached stress value and/or the running time and/or the number of switch actions and/or the number of measuring cycles. The additional indication of the running time makes it possible to determine, in which running-time category the hoisting equipment was operated. The number of switching actions shows under how much stress the drive was put during peak performances. The cube of the mean stress value may be calcuated from the stress value and the number of measuring cycles.

In some cases, and under conditions where the particular effect on wear was not recognized and may not be estimated, it is to be expected that the relative wear is greater than would be expected from the value for stress. In order to ascertain that the hoisting equipment is monitored in such cases as well, it is appropriate to monitor particularly wear-prone parts. This may be done in the conventional manner by monitoring the effects of the stress with the aid of boundary-value indicators for wear of the brake lining, the slowing-down period during the braking process, number of rotations of the drum, cable elongation, motor temperature, and oil level. In combining these boundary-value indicators with the determination of the stress values and the given condition information, a relationship between the wear of certain building groups and the stress value may be determined, even under special operating conditions, thereby making it subsequently possible to establish, in a simple manner, with the help of the stress value, the optimal point of time for preventive maintenance.

An apparatus for applying the method of determining the stress on hoisting equipment under consideration of the different loads is characterized by electrically connected electrical components including a timing generator, gate switch, analogue-to-digital converter, adder, memory, boundary-value comparator, and boundary-value indicator, as well as pulse-timing link connected between the analogue-to-digital converter and the memory. An analogue root-determining device may be connected to the analogue-to-digital converter. A digital root-determining device may be arrnged between the analogue-to-digital converter and the pulse-timing link as well as the adder. An impulse counter and a condition indicator may be series connected to the gate switch. A condition indicator may also be connected to the memory.

The hoisting installation is, according to the invention, equipped with an apparatus which forms the value for the stress according to the algorithm determined by introducing a constant measuring interval.

For a better understanding of the above and other features and advantages of the invention, reference should be made to the following detailed description of preferred embodiments of the invention and to the accompanying drawings.

BRIEF DESCRIPTION OF THE DRAWINGS

FIG. 2 is a schematic diagram of an alternative electrical circuit means arranged in accordance with the teachings of the invention.

DETAILED DESCRIPTION OF PREFERRED EMBODIMENTS OF THE INVENTION

Figure 1:
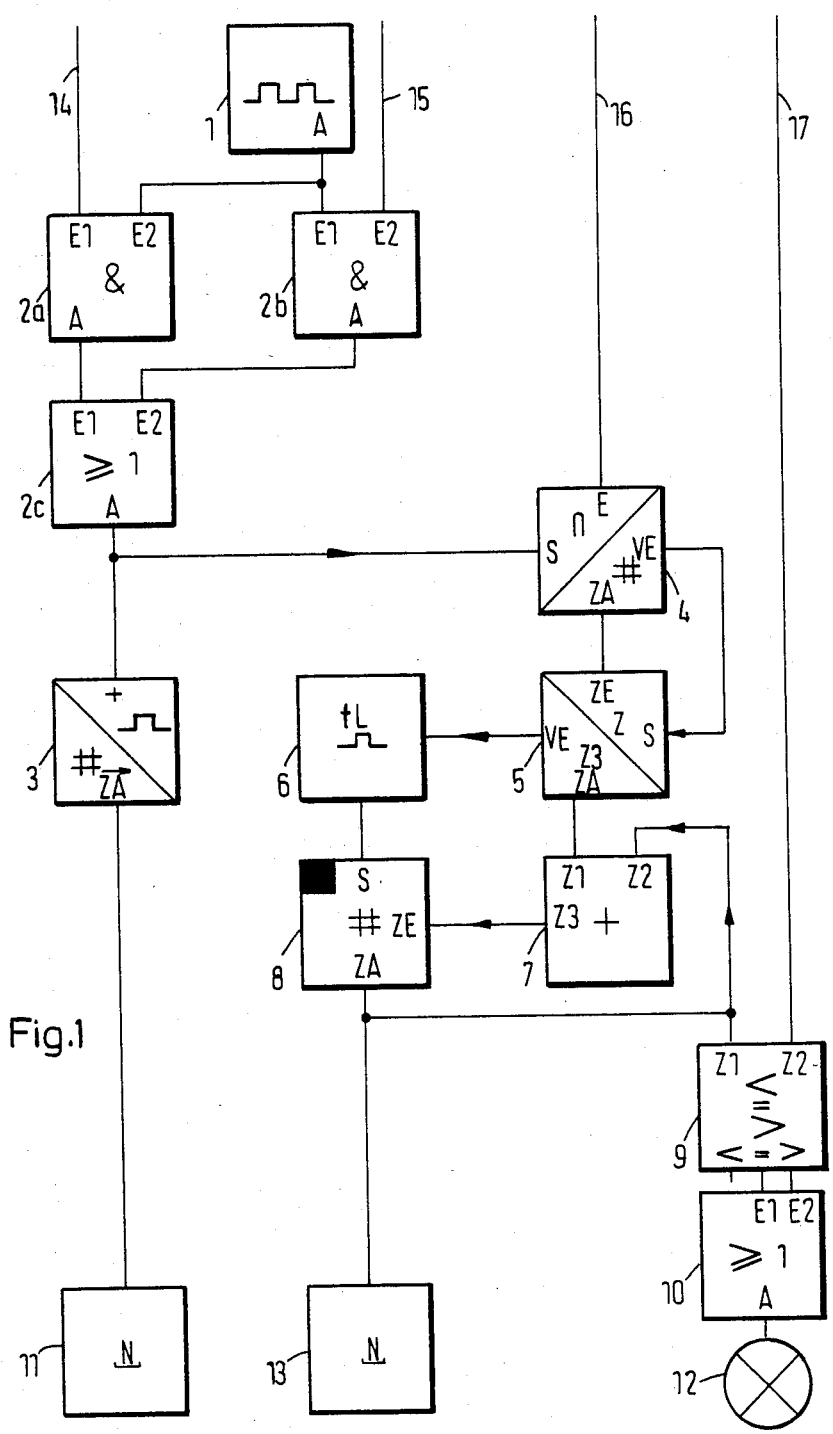
FIG. 1 is a schematic diagram of an electrical circuit operable in accordance with the invention.

The timing generator 1 illustrated in FIG. 1 generates impulses at equal time intervals to determine the measuring interval or coding period. The impulses of the timing generator 1 are transmitted via an electric signal applied to line 14 when the hoisting equipment is operated in a "lowering" mode; through the "lowering" mode gate switch 2a or alternatively via an electric signal applied to line 15 when the hoisting equipment is operated in a "lifting" mode through the "lifting" mode gate switch 2b to the inputs E1 or E2 respectively of an OR-gate switch 2c. The switch 2c switches the impulses from output terminal A to the input of an impulse counter 3. The impulse counter 3 counts the number of measured intervals generated by the timing generator 1.

The impulses at the output A of the gate switch 2c also control an analogue-to-digital converter 4 (through control input S of the converter 4) which generates, with each impulse, the digital value for the analogue magnitude of the relative load p on the hoisting equipment during the timing period, transmitted via line 16 from a load-measuring device mounted on the hoisting equipment (not illustrated). The digital value is available at the output ZA of the analogue-to-digital converter 4 for further processing when a signal indicating the end of the coding period appears at the output VE of the converter 4.

The analogue-to-digital converter 4 controls a digital power-determining device 5 with the signal for the "end of coding" period transmitted from the output VE of the converter 4 to the control input S of the device 5. The device 5 generates a signal corresponding to the cube of the value transmitted to its input ZE from the output ZA of the digital-to-analogue converter 4. The cube value is transmitted to the input Z1 of an adder 7 from output ZA of the device 5. Output VE of the digital power-determining device 5 provides a signal at the end of the coding period, which is detained in a pulse-timing link 6 by an amount of time equal to the processing time of the adder 7. The output of the time delay device 6 in turn controls the transmission of the output value at Z3 of the adder 7 into the input ZE of the memory 8. The adder 7 generates a sum consisting of the present value memorized in memory 8 and the value for $p^3$ corresponding to the current timing period delivered by the digital power-determining device 5. Of course, for this operation, the output ZA of the memory 8 is electrically connected to the input Z2 of the adder 7. The sum is transmitted from the output Z3 of the adder 7 and, by means of the adder 7, to the input ZE of the memory 8. The output ZA of the memory 8 transmits the digital value for the stress of the hoisting installation. This value is transmitted to the input Z1 of a comparator 9 and is compared with a value, inputted to input Z2 and corresponding to the permissible stress, transmitted via the feed line 17 from a digital boundary-value indicator (not illustrated). The signals created by the comparator for the result $Z1=Z2$, as well as for the result $Z1>Z2$, are processed by the series connected logical OR-gate 10 such that an alarm signal, for example an on-off light 12, is switched on via output A of the OR-gate 10 when the permissible stress has been reached or exceeded.

In cases of application where the load-measuring device on the hoisting installation already indicates the relative load p as corresponding digital value, the analogue-to-digital conversion is not necessary, the digital value is processed directly by the digital power-determining device 5 which, in such a case, is controlled by the impulse from the output A of the OR-gate switch 2c.

The output of the impulse counter 3, indicating the number of measuring cycles is transmitted to a numerical indicator 11. In the same manner, the value stored in the memory 8 is transmitted from output ZA to a numerical indicator 13 to provide stress information. The condition information of the exemplary embodiment of the invention, represented in FIG. 1, thereby indicates whether the permissible stress was reached or exceeded, how great the stress value is, and the number of measuring cycles executed during the operating time of the hoisting installation. It is possible to determine the running time of the hoisting equipment from the indicated number of the measuring cycles by multiplying the number of cycles by the duration of each time interval. The quotient between the indicated value for the stress and the number of the measuring cycles is the cube of the mean value of the stress.

FIG. 2 illustrates a modified switching device, in which an analogue power-determining device 27 provides an output corresponding to analogue magnitude p which is converted into a corresponding digital value by means of the analogue-to-digital converter 4, said value further processed by the adder 7, as described above for FIG. 1.

The circuit represented in FIG. 2 has been extended by function units generating additional condition information such as the cube of the mean value of the stress, the number of switching operations, separately for the "lift" mode and "lower" mode of the hoisting equipment, and the running time of the hoisting equipment. A divider 18 provides the quotient between the stress value at the input Z2 and the number of measuring cycles at input Z1. From this information, a root-determining device 19 provides the cube of the mean value of the stress of the hoisting equipment. This value is indicated by a numerical indicator 20 electrically connected to the device 19. Line 14 provides a positive electrical signal when the hoisting equipment is in the "lower" mode for the duration of "lower" mode. Each positive signal on line 14 increases a meter 21 by 1. The value at output ZA of meter 21 corresponds to the number of switching operations for lowering the hoist and is indicated on the numerical indicator 22 electrically connected to the meter 21. In the same manner, the value of the number of switching operations for lifting the hoist are counted by a meter 23 connected to line 15 and indicated on a numerical indicator 24. A multiplier 25 connected to the impulse counter 3 multiplies the value inputed to input ZE of the multiplier 25 corresponding to the number of measuring cycles by the constant time corrresponding to the duration of each measuring interval. The result is the running time of the electric hoist, the value of which is indicated on a numerical indicator 26.

The circuits represented in FIGS. 1 and 2 may be constructed, with commercially available analogue and digital electronic components. The use of a correspondingly programmed micro computer is advantageous for realizing the digital function units. This computer, besides executing the functions for determining and monitoring the stress of the hoisting equipment, may also execute the functions for calculating the individual condition information, with only minimal additional expenditure.

It should be understood, of course, that the above described preferred embodiments of the invention are intended to be representative only, as certain changes may be made therein without departing from clear teachings of the disclosure. Accordingly, reference should be made to the following appended claims in determining the full scope of the invention.

We claim:

1. A method for determining the stress on hoisting equipment characterized by a value indicative of such stress and determined as a function of the load and running time of said hoisting equipment, comprising the steps of
    (a) generating a series of constant time interval electrical signals,
    (b) generating an electrical signal upon and during operation of said hoisting equipment to indicate operation of the hoisting equipment,
    (c) conducting said series of constant time interval electrical signals and said electrical signal to indicate operation of said hoisting equipment to the input means of an AND gate electrical means whereby said AND gate means generates an output when both the series of constant time interval signals and the signal to indicate the operation of the hoisting equipment are conducted to said input means of the AND gate electrical means,
    (d) generating a signal corresponding to the value of the load being handled by said hoisting equipment,
    (e) conducting said signal corresponding to the value of the load to an electrical calculating means,
    (f) utilizing the output of said AND gate means to control the operation of said electrical calculating means, whereby said electrical calculating means calculates the cube of the value corresponding to the load during the time interval of each particular one of the series of constant time interval electrical signals and generates an electrical signal corresponding to each calculation,
    (g) conducting said electrical signals corresponding to the cubes of the values of the load during each particular one of the series of constant time interval electrical signals sequentially to an electrical adding and storage means whereby the value of each signal is stored and added to a sum representing the total value of the signals corresponding to the cube of the load during each time interval of each particular one of the series of constant time interval electrical signals which have been conducted to said electrical adding and storage means and an electrical signal corresponding to said sum is generated,
    (h) generating an electrical signal corresponding to a predetermined maximum sum for the cubes of the values of the load during each particular one of the series of constant time interval electrical signals,
    (i) conducting the electrical signal corresponding to said predetermined maximum sum and the electrical signal corresponding to the sum stored in said adding and storage means to input means of an electrical comparator means,
    (j) operating said electrical comparator means to compare the signal corresponding to the sum stored in the electrical adding and storage means with the electrical signal corresponding to the value of said predetermined maximum sum whereby the electrical comparator means generates an output signal when the electrical signal corresponding to the sum stored in the electrical adding and storage means is equal to or greater than the electrical signal corresponding to said predetermined maximum sum, and
    (k) utilizing the output signal of said electrical comparator means to operate an indicator means.

2. The method according to claim 1, further characterized by utilizing the electrical signal corresponding to the sum stored in said adding and storage means to operate a second indicator means.

3. The method according to claim 1, further characterized by utilizing the output of said AND gate means to operate a third indicator means.

4. The method according to claim 3, further characterized by utilizing the output of said AND gate to operate an electronic counter means to count the number of constant time interval electrical signals generated during the operation of said hoisting equipment and to generate an electrical signal corresponding to the number of said count.

5. The method according to claim 4, further characterized by utilizing said last-mentioned electrical signal to operate an electronic multiplier means whereby said electronic multiplier means calculates the total running time of said hoisting equipment.

6. The method according to claim 5, further characterized by
 (a) utilizing said electronic multiplier means to generate an output signal corresponding to the total running time of said hoisting means,
 (b) utilizing said output signal corresponding to the total running time of the hoisting equipment to operate a fourth indicator means.

7. The method according to claim 4, further characterized by
 (a) conducting the signal corresponding to the sum stored in the electrical adding and storage means and the electrical signal corresponding to the number of constant time interval electrical signals generated during the operation of said hoisting equipment to the input of an electronic divider means,
 (b) operating the electronic divider means to calculate the quotient between the sum stored in the electrical adding and storage means and the number of constant time interval electrical signals generated during the operation of said hoisting equipment, and
 (c) generating an electrical signal corresponding to said quotient.

8. The method according to claim 7, further characterized by
 (a) conducting said electrical signal corresponding to the quotient to the input of an electronic calculating means,
 (b) operating said electronic calculating means to generate an electrical signal corresponding to the cube of said quotient whereby the mean value of the stress of the hoisting equipment is calculated.

9. The method according to claim 8, further characterized by utilizing said electrical signal corresponding to the cube of said quotient to operate a fifth indicator means.

10. A method for determining the stress on hoisting equipment characterized by a value indicative of such stress and determined as a function of the load and running time of said hoisting equipment, comprising the steps of
 (a) generating a series of constant time interval electrical signals,
 (b) generating an electrical signal upon and during operation of said hoisting equipment to indicate operation of the hoisting equipment,
 (c) generating a signal corresponding to the value of the load being handled by said hoisting equipment,
 (d) conducting said series of constant time interval electrical signals, said electrical signal to indicate operation of said hoisting equipment, and said electrical signal corresponding to the value of the loading being handled by said hoisting equipment to the input of an electrical calculating means,
 (e) operating said electrical calculating means whereby said electrical calculating means calculates the cube of the value corresponding to the load during the time interval of each particular one of the series of constant time interval electrical signals generated during the time of operation of said hoisting equipment and generates an electrical signal corresponding to each calculation,
 (f) conducting said electrical signals corresponding to each of said calculations sequentially to an electrical adding and storage means whereby the value of each signal is stored and added to a sum representing the total value of said signals which have been conducted to said electrical adding and storage means and an electrical signal corresponding to said sum is generated,
 (g) conducting the electrical signal corresponding to the sum stored in said adding and storage means to input means of an electrical comparator means,
 (h) operating said electrical comparator means to compare the signal corresponding to the sum stored in the electrical adding and storage means with a predetermined value whereby the electrical comparator means generates an output signal when there is a predetermined relationship between the electrical signal corresponding to the sum stored in the electrical adding and storage means and said predetermined value, and
 (i) utilizing the output signal of said electrical comparator means to operate an indicator means.

11. The method according to claim 10, further characterized by generating said electrical signal upon or during operation of said hoisting equipment by generating a first electrical signal corresponding to operation of said hoisting equipment in a lifting mode and a second electrical signal corresponding to operation of the hoisting equipment in the lowering mode.

12. The method according to claim 11, further characterized by
 (a) utilizing said first electrical signal to operate a first indicator means, and
 (b) utilizing said second electrical signal to operate a second indicator means.

13. An apparatus for detecting stress on hoisting equipment which comprises
 (a) a time signal generator for generating a series of constant time interval electrical signals,
 (b) first electrical conductor means being selectively operative to conduct an electrical signal indicating operation of the hoisting equipment,
 (c) second electrical conductor means being selectively operative to conduct an electrical signal corresponding to the value of the load being handled by said hoisting equipment,
 (d) first circuit means electrically connected with each of said time signal generator and said first conductor means,
 (e) said first circuit means being operative to provide an output signal when both the time signal generator and said first conductor means are operative,
 (f) second circuit means electrically connected with each of said first circuit means and said second conductor means, (g) said second circuit means being operative to calculate the cube of the value corresponding to the load during the time interval of each particular one of the series of constant time interval electrical signals generated by said time signal generator during the operation of said first conductor means and to generate an electrical signal corresponding to each such calculation, (h) said second circuit means being electrically connected to an electrical adding and storage means, (i) said electrical adding and storage means being operative to determine and electrically store a sum equal to the sum of all the electrical signals generated by said second circuit means, (j) said electrical adding and storage means including an output means to conduct an output signal corresponding to the sum stored in said electrical adding and storage means, (k) a comparator means connected to the output means of the electrical adding and storage means for comparing a predetermined value with the output of said electrical adding and storage means, and (l) an indicator means electrically connected to said comparator means, (m) said comparator means being operative upon a predetermined relationship between the output of said electrical adding and storage means and said predetermined value to operate said indicator means.

14. The apparatus according to claim 13, wherein said first circuit means comprises an AND gate means.

15. The apparatus according to claim 13, wherein
(a) said first electrical conductor means comprises a conducting means operative to conduct an electrical signal indicating operation of the hoisting equipment during a lifting mode and a conducting means operative to conduct an electrical signal indicating operation of the hoisting equipment during a lowering mode,
(b) each of said last mentioned conducting means being connected to an indicator means whereby the number of operations of the hoisting equipment in each of the lifting and lowering modes may be indicated.

* * * * *